United States Patent [19]

Iida

[11] 4,318,781
[45] Mar. 9, 1982

[54] DESALINAZATION APPARATUS

[76] Inventor: Tomimaru Iida, 5-20-11, Todoroki, Setagaya-ku, Tokyo, Japan

[21] Appl. No.: 111,331

[22] Filed: Jan. 11, 1980

[51] Int. Cl.³ .............................................. C02F 1/14
[52] U.S. Cl. .................... 202/173; 202/177;
202/180; 202/205; 202/234; 203/11; 203/49;
203/86; 203/92; 203/100; 203/DIG. 1;
126/435; 126/900; 165/109 R; 165/DIG. 11
[58] Field of Search ................ 203/DIG. 1, 100, 99,
203/49, 10, 11, 86, 92, 93, 96, 95, 97, DIG. 14,
DIG. 17; 202/173, 234, 233, 235, 177, 236, 175,
267, 180; 165/109, DIG. 11; 126/900, 435

[56] References Cited

U.S. PATENT DOCUMENTS

| 291,175 | 1/1884 | Evans | 203/95 |
|---|---|---|---|
| 2,490,659 | 12/1949 | Snyder | 203/DIG. 1 |
| 2,902,028 | 9/1959 | Manly | 203/DIG. 1 |
| 2,969,637 | 1/1961 | Rowekamp | 203/DIG. 1 |
| 3,076,096 | 1/1963 | Bachmann | 203/DIG. 1 |
| 3,138,546 | 6/1964 | Muller | 203/DIG. 1 |
| 3,190,816 | 6/1965 | Ademac | 203/DIG. 1 |
| 3,394,054 | 7/1968 | Hokam | 202/234 |
| 3,414,753 | 12/1968 | Hruda | 165/DIG. 11 |
| 3,788,393 | 1/1974 | Plizak | 165/109 |

Primary Examiner—Wilbur L. Bascomb, Jr.
Attorney, Agent, or Firm—Birch, Stewart, Kolasch & Birch

[57] ABSTRACT

A desalinazation apparatus has the bulk of its piping circuitry composed of black iron pipe, or similar pipe, which is normally subject to corrosion by sea water. Heat transfer to a salt water still includes indirect heat transfer by a thermal oil which is contained in the black iron pipe. A solar collector heat source is used to heat the heat transfer oil. The heat transfer rate from the heat transfer oil is maintained by using turbulence inducing fins in the interior of the heat transfer tubes in the salt water still and by directing high pressure gas at the exterior of the heat transfer tubes in the salt water still. A manifold of jets placed beneath the heat transfer tubes in the salt water still projects the high pressure gas, such as high pressure high temperature steam, onto the exterior of the heat exchange tubes.

11 Claims, 5 Drawing Figures

DESALINAZATION APPARATUS

BACKGROUND AND SUMMARY OF THE INVENTION

This invention relates to improvement in a sea to fresh water converting system or a desalinazation apparatus utilizing solar energy.

From energy conserving point of view, various desalinazation apparatus utilizing solar energy have been proposed so far. Most of these desalinazation apparatus are of the type in which sea water is heated to 100° C. or more by solar energy and led to the evaporator of the apparatus. Even before then, a number of desalinazation apparatus using fossil fuel as a heating source, have been known in which sea water is also heated to a very high temperature and led to the evaporator. In these conventional apparatus, such expensive materials as cupronickel, aluminium-alloy, brass and titanium were used to withstand the bad corrosion of the pipes due to the sea water which passes therethrough at a temperature over 100° C. For larger models of the desalinazation apparatus, cost of the pipes accounts for 30-55% of the entire construction fee, therefore the heat transferring pipes take up a large amount of the fee. It is thus desired to use an economical pipe material that is corrosion resistant with less resource problems. As the desalinazation apparatus utilizing solar energy is usually of a large scale, pipes leading the sea water to a solar energy collector and from there the heated sea water to the evaporator, what is called a collector circuit, would be considerably long and this fact would pose a considerable problem.

It is therefore a main object of the invention to solve such technical and financial problems involved in the installation of the heat transferring pipes for the solar energy desalinazation apparatus. For this end, first of all, oil is used as a heat transferring medium for the collector circuit, thereby avoiding the use of the conventional expensive materials and also eliminating technical difficulties by development of piping joint, taking into consideration the corrosion caused by hot sea water. In order to compensate for the decrease of thermal efficiency due to the use of oil, use is made of a bubble disturbance effect to take advantage of thermal transfer acceleration, if necessary, thereby increasing the thermal efficiency and offering an improved sea water to fresh water converting system.

DESCRIPTION OF THE DRAWINGS

The invention will be described in detail with reference to accompanying drawings in which.

DESCRIPTION OF THE PREFERRED EMBODIMENTS

Figure 1:
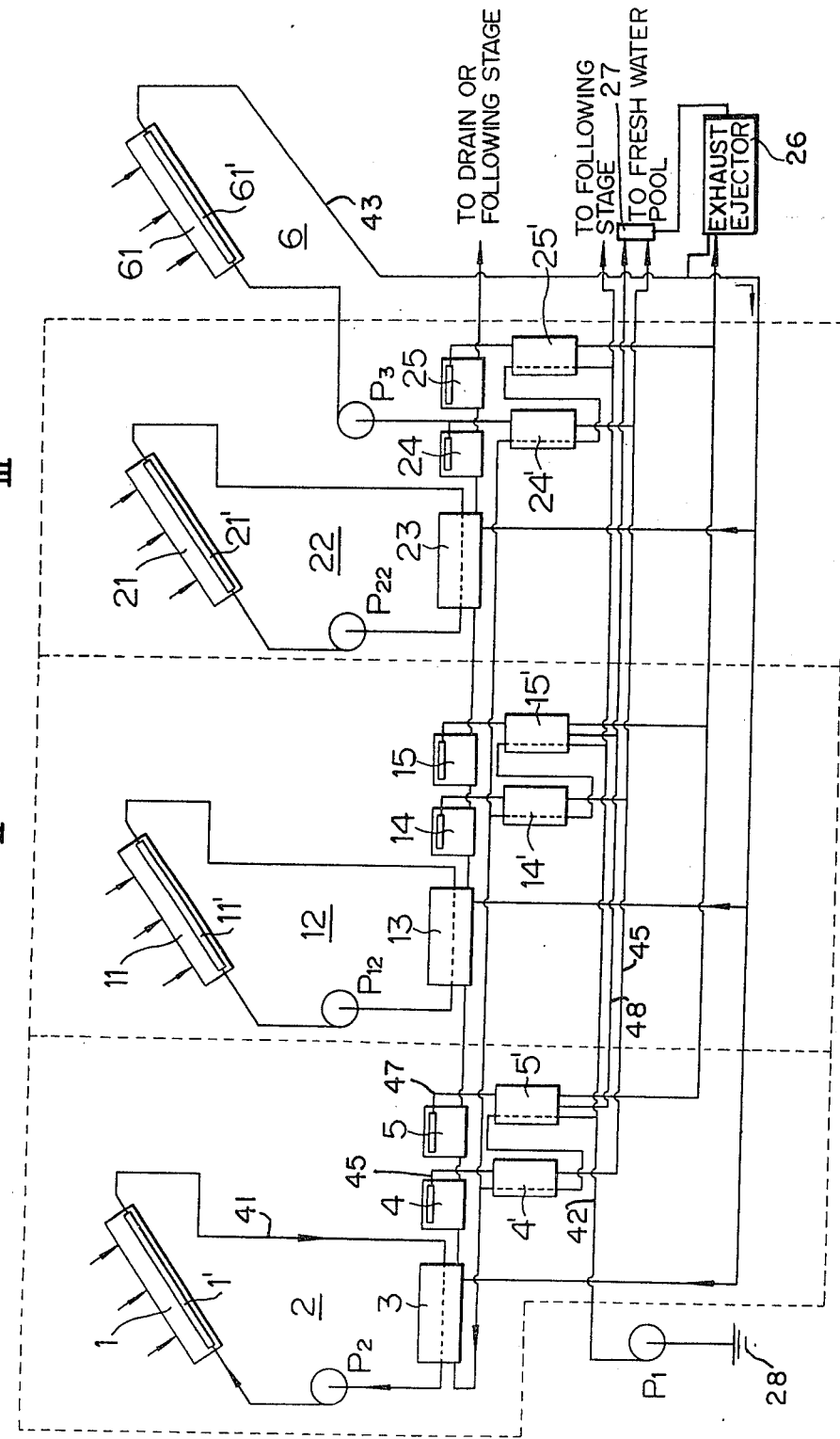
FIG. 1 is a schematic illustration of the desalinazation apparatus according to the invention.

Referring now to FIG. 1 showing the desalinazation apparatus according to this invention, three stages of evaporation I, II and III are illustrated by way of example, however, any number of stages of evaporation can be added according to necessity. Each stage of evaporation I, II, III is indicated with broken lines. As each stage of evaporation is of the same construction, the first stage of evaporation I will be only explained.

The first stage of evaporation 1 is basically comprised of an oil circulation system or collector circuit 2, a sea water system and a fresh water removing system. Collector circuit 2 includes a heat collector 1, a first heat exchanger 3 and a circulating pump $P_2$, all of which are connected with a pipe 41 to form a closed circuit for circulating oil such as light oil therethrough. Heat exchanger 3 serves to exchange heat between oil and sea water introduced by the sea water system. Sea water pumped up by a pump $P_1$ runs through a second heat exchanger 5', a third heat exchanger 4', the first heat exchanger 3, a first distillator 4 and a second heat distillation 5 to a following stage or drain. Pump $P_1$, second and third heat exchangers 5', 4', first heat exchanger 3, and first and second distillators 4, 5 are connected to each other by means of a pipe 42 to form the sea water circuit distillators 4 and 5 connected to the downstream of the heat exchanger 3 for obtaining water vapor by evaporating the sea water heated by the heat exchanger 3 and heat exchangers 4' and 5' for condensing the water vapor obtained in the distillators 4 and 5. A super heated vapor system indicated by numeral 6 is basically comprised of a pump $P_3$ and heat collector 61 connecting to first heat exchanger 3 by means of pipe 43. Super heated water vapor is supplied by a super heated water vapor generator 6 to the heat exchanger 3, if desired. This super heated water vapor provides a bubble disturbance effect in the heat exchanger 3 and this particular effect will be explained hereinafter.

Components for the second stage of evaporation II and the third stage of evaporation III are indicated with addition to 10 and 20 to the respective reference numbers of the components for the first stage of evaporation I. For example; the heat collector of the second stage of evaporation II is shown by reference number 11 and the heat collector of the third stage of evaporation III is shown by reference number 21.

The following is an explanation of the various components which constitute the stage of evaporation. First of all, for example, a cylindrical parabolic collector of solar energy is used for the heat collector 1 where oil is heated to more than 130° C. by solar energy. To do this, according to the amount of radiation from the sun, necessary steps are taken such that the light receiving area in the heat collector pipe 1' can be made larger or a spiral fin can be provided lengthwise on the inner wall of the heat collector pipe 1', thereby causing a turbulent flow of the oil which flows through it to obtain a higher heat transferring efficiency or the inner wall of the heat collector pipe 1' is covered with a selective penetrating film to prevent the heat once absorbed by the oil from escaping as radiation of infrared rays as much as possible. If the heat collector 1 alone is not enough to heat the oil to the required temperature, additional heat collector can be provided upsteam of the heat collector 1. This heat collector may be made of a twofold iron pipe covered with an inexpensive optical transparent glass pipe or plastic pipe. The space between the inner pipe whose surface is being treated to absorb heat and the outer pipe is evacuated or subjected to reduction of pressure to avoid loss of the heat once absorbed. The oil can be heated up to about 60° C. with the heat collector alone.

According to the invention, oil is circulated through the heat collector circuit 2 including the heat collector 1 for the reason that there is far less bad effect such as rust and deterioration on the heat transferring piping than circulation of high temperature sea water only. As an example, it is vital for the oil that can be used in the heat collector circuit 2 to have a large specific heat (especially while in use), not to degenerate for long hours, to tolerate usage in a considerably high temperature (above 100° C.), to have as little viscosity as possible and to have high flashing and firing points. The oil that would satisfy this condition would be light oil developed as a heat media for chemical industrial purposes and one example of such oil is Hi-Therm PS 5 (brand name) produced by Japan Petroleum Chemical (0.46 cal/g°C. for specific heat of 100° C., 0.5 cal/g°C. for specific heat of 120° C., viscosity 0.05 poise at the temperature of 37.8° C., flashing point 146° C.). According to the invention, as the oil with the above mentioned qualities is circulated in the heat collector circuit 2, it is possible to use an inexpensive iron pipe as a heat transmitting pipe, and also to use an iron pipe or an aluminium pipe with endothermix treatment on the outer surface thereof for the heat collector pipe 1' of the heat collector 1. With the sea to fresh water converting system by use of solar energy, as mentioned above, the scale of the heat collector circuit itself is not only enormous but the heat transmitting pipe system of the heat collector circuit in relation to the system's entire quantity of the tubes take up so considerably in proportion that to have an inexpensive material for the iron pipes for the heat transmitting pipe system of the heat collector circuit would make a great contribution to economy of the entire apparatus.

Figure 2:
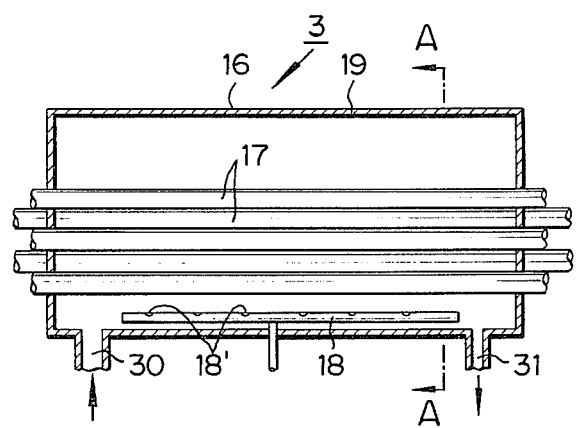
FIG. 2 is a longitudinal sectional view of the heat exchanger used for the apparatus of this invention.

Next, as details can be seen in FIG. 2, heat exchanger 3 for heating sea water has a number of heat exchanging pipes 17 that make up a part of the heat collector circuit 2, within the lower interior of the concrete outer pipe 16, for example, Hume TM concrete pipe, and a blowing pipe 18 below those heat exchanging pipes 17 that blows super heated water vapor into the outer pipe 16 as necessary. The blowing pipe 18 is provided with openings 18' lengthwise at regular intervals. A sea water inlet 30 and a sea water outlet 31 are provided on the ends of the outer pipe 16. Within the heat exchanging pipes 17, oil of the temperature of 130° C. flows and the pipes 17 are surrounded by the sea water whose temperature is between 80° C. and 120° C. (maximum 121° C., and the concrete outer pipe 16 is of course closed up tight and is made to tolerate inner pressure of over 2 atmospheres pressure.). Therefore, it is desirable to have a metal pipe which is resistant against sea water. For example a copper alloy such as everbrass and cupronickel or titanium may be used.

Figure 4:
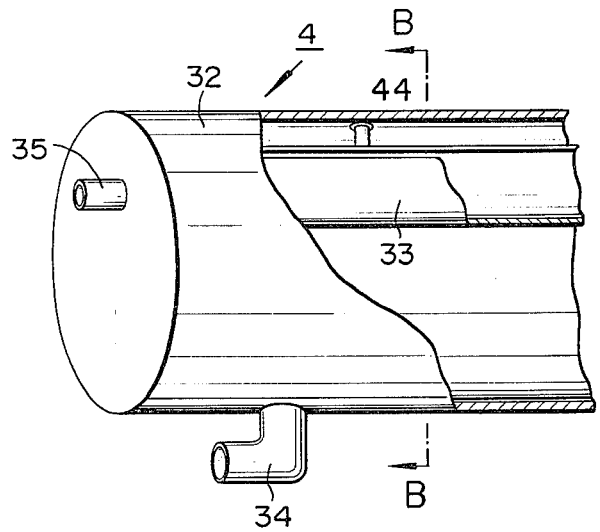
FIG. 4 is a perspective view of the evaporator used in the apparatus of the invention partially in section and FIG. 5 is a cross sectional view taken along the line B—B of FIG. 4.
Figure 5:
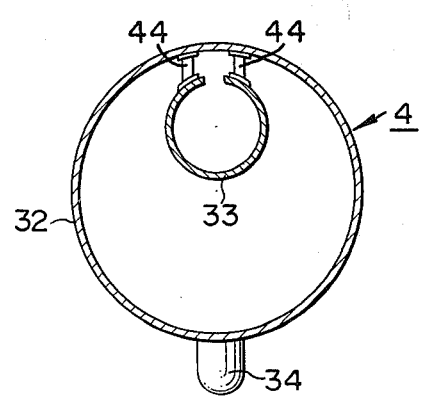

In order to heighten the heat transmitting efficiency between the oil and the sea water, such steps as to fix a spiral fin lengthwise within the heat exchanging pipes 17 or to insert a twisted metal plate within the pipes so as to cause a turbulent flow of the oil is preferably employed. Another measure to heighten the heat transmitting efficiency between the oil and the sea water is to blow the super heated water vapor into the sea water from the openings 18' of the super heated water vapor blowing pipe 18 so as to cause the disturbance effect. It has been proved through experiment that the heat transferring characteristic was remarkably improved by the disturbance effect caused by these bubbles in comparison with that in stream line flow. It is desirable to make the super heated water vapor blowing pipe 18 with heat resisting materials such as glass, for example Pyrex glass or silicone rubber that would not rust or deteriorate with the high temperature sea water. In the event concrete pipe is used for the exterior pipe 16, it is preferable that the interior surface of the exterior pipe 16 is covered with a resin such as epoxy resin that is resistent to adhesive chemicals, so that the interior surface of the pipe becomes stable against chemical action and can tolerate the vapor pressure of about 2 atmospheres pressure of the sea water that is high in temperature. The super heated water vapor blowing pipe 18 is connected to the superheated water vapor generator 6, but the pipe connecting them may be made of iron that is inexpensive. Distillation devices 4 and 5 have the same general shape as shown in detail in FIGS. 4 and 5. A vapor pipe 33 is disposed at the upper portion of the outer concrete pipe 32 where is is suspended therefrom by a couple of supports 44. The outer pipe 33 is provided with a sea water outlet 34 and a sea water inlet (not shown) similar in shape to outlet 34. It goes without saying that the outer pipe 32 is provided with an outlet 35 for water vapor which connects to fresh water pool 27 through heat exchanger 4' by means of pipe 45. Namely, vapor pipe 33 is connected to a heat exchanger 4' while the vapor pipe of distillation 5 is connected to heat exchanger 5' through pipe 46. Pipes 45 and 46 are elongated from heat exchanger 4' and 5', respectively, so as to connect to the fresh water pool 27. An exhaust system is connected to distillator 5 through heat exchanger 5' by means of pipe 47, to reduce air pressure within the distillation 5. The heat exchangers 4' and 5' may be of a conventional model and the water vapor taken from the vapor pipe 33 of the still 4 is cooled by the sea water and changed into fresh water. Simultaneously, the sea water is warmed. A super heated water vapor generator 6 is made up of a heat collector 61 including a heat collector pipe 61' used for heating part of the water vapor generated by the still 24, and has the same construction as the heat collector for each stage of evaporation. The water vapor collected from the vapor pipe of the still 24 is conducted by the pump $P_3$ to the heat collector pipe 61' of the heat collector 61 where the vapor is heated to about 150° C. and changed into a super heated water vapor. The super heated water vapor thus produced is supplied to the super heated water vapor blowing pipe (for example, pipe 18 in FIG. 2) of the heat exchangers 3, 13 and 23 of each stage of evaporation.

The desalinazation apparatus as above mentioned operates as follows:

As each stage of evaporation works in the same manner, only the first stage of evaporation I will be explained. First, sea water is pumped up by a pump $P_1$ from a sea water resource 28 through the copper-iron elimination device and deoxidation device and passes into the heat exchanger 5' for condensing water vapor and then the heat exchanger 4' of the stage of evaporation, and supplied to the heat exchanger 3 for heating the sea water. Sea water of about 20° C. cools off the water vapor coming from the vapor pipe in the heat exchangers 5' and 4' and at the same time the sea water itself is heated to over 40° C.

Figure 3:
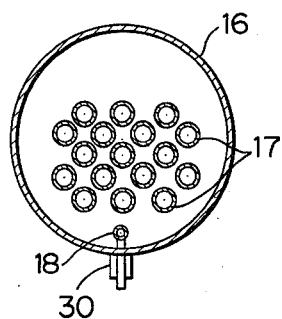
FIG. 3 is a cross sectional view taken along the line A—A of FIG. 2.

On the other hand, oil is circulated by pump $P_2$ in the heat collector circuit 2, and heated by the heat collector 1 to over 130° C. and supplied to the heat exchanger 3. In detail, the heated oil is supplied to the heat exchanging pipes 17, (viz. FIGS. 2 and 3) and exchanges heat with the sea water led in through the inlet 30 that flows around the heat exchanger 17. At this time, the super heated water vapor of about for example 150° C. supplied from the super heated water vapor generator 6 is blown into the sea water from the openings 18' thereof to cause disturbance of the sea water so that the sea water exchanges heat efficiently with the hot oil that flows through the heat exchanging pipes 17. By this bubble disturbance effect, the heat transferring effect is increased and the thermal efficiency of the entire system is increased. Number of openings 18' of the blowing pipe 18, the area of the openings 18', and the temperature of the super heated water vapor are determined by taking into account the size of the system especially the amount of sea water for which heat exchanging is necessary. The super heated water vapor that is blown into the sea water not only causes a bubble disturbance effect but it transfers its heat to the sea water and turns into water. At this time, when the water vapor of 100° C. turns into water of 100° C., it gives off heat of condensation of 539 cal./gram which is equivalent to heat of evaporation thereby to help further raise of the sea water temperature. Bubbles hit against the surface of the heat transferring pipe of the exchanger and burst, so that educt or the like which has been separated from the sea water and sticks to the surface of the pipe is removed and the metal surface is always kept in an exposed condition. In this manner, the sea water is heated to at least the temperature of over 100° C. within the heat exchanger 3. If it is assumed that the super heated water vapor is blown into the sea water of 120° C., for example, when water vapor of one gramme turns into water of the same temperature of one gramme, heat of about 526 cal. is emitted, so the super heated water vapor will have the bubble effect and the effect of raising the temperature of sea water. In this manner sea water of about 40° C. that is led in through the sea water inlet 30 exchanges heat with the oil and is heated to the temperature of above 100° C. It is to be noted in respect to heating of the sea water that a spiral fin fixed to the inner wall of the heat exchanging pipes 17, according to necessity is making a contribution aside from the above mentioned bubble disturbance effect of the super heated water vapor. The super heated water vapor blowing pipe 18 can be arranged in different positions in the heat exchanging pipes 17, but the position should be determined in such a way that the heat exchanging efficiency will be at its best.

Sea water that has been heated to above 100° C. by the heat exchanger 3, is led out of the sea water outlet 31 and supplied to the still 4. In the still 4 the sea water that is about 121° C. boils due to difference in vapor pressure from the atmospheric pressure while giving off water vapor and passes into the still 5 while being decreased in temperature to the temperature to about 100° C. As the still 5 is reduced in pressure through pipe 47 by the exhaust ejecter 26, the sea water that has been led into the still 5 boils vigorously again and sends off water vapor and a large heat of vaporization is taken away and the temperature will drop. The water vapor collected in the vapor pipe 33 within the stills 4 and 5 is led the pipes 45 and 47 to the heat exchangers 4' and 5' and as mentioned above is cooled by the sea water and turned into a pure fresh water and is led into the fresh water pool 27. The stills 4 and 5 are made up of a number of distilling stages and the sea water that is led in at over 100° C. gradually drops in temperature as it gives off water vapor and goes through each distilling stage and when it finally drops to 60° C. in the last distilling stage where it is led to the second stage of evaporation II and it repeats the same operation as that of the first stage of evaporation I.

According to the number of distilling stages of the stills 4 and 5, the heat exchanger 4' and 5' are separated according to the temperature and is so constructed that from the direction in which the sea water is led the water vapor of lower temperature is conducted sequentially. As an example, if there are three distilling stages in the still 5, the heat exchanger 5' is separated into three partitions and the sea water will be increased in temperature from about 20° C. to about 40° C. while passing through the heat exchanger 5'. In this manner, while the same function is repeated in the first stage of evaporation I, the second stage of evaporation II and the third stage of evaporation III, salt density of the sea water gradually increases from 3.5% on an average of about 6% in the final stage of evaporation. The condensed sea water which actually is brine is finally exhausted from the final stage of evaporation or carried to the salt refinery.

In the example above illustrated, light oil was used as the best example of heat medium but it is also possible to use oil such as vegetable oil and organic oil as a possible heat medium.

The pipings used in the desalinazation apparatus according to the invention may be made of iron, organic resin or concrete except for the interior of the heat exchanger 3 which treats the sea water of high temperature. It greatly contributes to economy of the apparatus that iron pipes can be used for the heat transmitting pipe of the heat collector circuit that takes up a large portion of the piping of the entire system, and it is technically advantageous not to have to take into consideration at all, the rust of the pipe joints caused by the sea water as it is not necessary to pass the high temperature sea water through the heat collector circuit. It is a result of using oil as a heat medium through the heat collector circuit that has the least ill effect such as rust and deterioration to the heat transmitting pipe system. The part of the entire piping system that should be considered to be resistant against the sea water, is only the heat exchanging pipes 17 arranged within the heat exchanger that contacts directly with the high temperature sea water for heat exchange. For example, metal pipes which are made of copper alloy such as everbrass and cupronickel or titanium metal which are strong against the sea water may be used for the heat exchanging pipes 17, however proportion of such expensive pipes is very small. In the invention, oil such as light oil is circulated in the heat collector circuit, and therefore it is necessary to transfer the heat to the sea water. For this reason, heat efficiency may be lower than that of the conventional apparatus in which the sea water flows in the heat collector circuit. However, it is possible to take advantage of the bubble disturbing effect caused by the super heated water vapor blown into sea water at the time of heat exchange and the heat of the super heated water vapor and the condensation of heat which is caused when the super heated water vapor turns into water and it is therefore possible to heighten heat efficiency and compensate for decrease in heat efficiency to a considerable extent.

Any gas such as air besides super heated water vapor that is relatively easily available can be used to provide the bubble disturbance effect. If air is used, it is necessary to set up an air exhausting means. Introduction of the bubble disturbance effect in the heat exchanger of the desalinazation apparatus is most effective in raising the necessary temperature of the sea water within a short time, and thus contributes to small size of the heat exchanger.

The invention has been described by way of example, however, it is the intent of the inventor that the invention should not be limited to such example, but may be modified or changed within the scope of the invention.

What is claimed is:

1. A desalinazation apparatus comprising:
   at least one oil circulation system including a first heat collector which utilizes solar energy, a first heat exchanger and a circulating pump, all of said elements being connected together by a pipe member to form a closed circuit for circulating oil therethrough,
   at least one sea water system including second heat exchanger connected in series by a pipe member on the upstream side of said first heat exchanger and a distillator connected by a pipe member to the downstream side of said first heat exchanger and a pump means for conveying sea water through said second exchangers and into indirect heat exchange relationship with said oil circulation system in said first heat exchanger,
   means for removing the treated sea water from said distillator,
   means for removing fresh water from said distillator, and
   a gas supplying system for supplying gas to said first heat exchanger including a second heat collector, means for introducing at least a portion of said gas into said second heat collector to circulate said gas therein, and means for conveying said gas to said first heat exchanger for supplying additional heat and obtaining a bubble disturbance effect therein.

2. The desalinization apparatus according to claim 1, further including an additional distillator connected in series by a pipe member to the downstream side of said first distillator.

3. The desalinization apparatus according to claim 2, wherein said additional distillator is connected through a third heat exchanger to an exhaust ejector means by a pipe member for reducing the pressure therein.

4. The desalinization apparatus according to claim 1, wherein said gas supplying system comprises a super heated vapor system for supplying super heated water vapor to said first heat exchanger.

5. The desalinization apparatus according to claim 1, wherein said first heat collector includes a plurality of heat collecting pipes made of iron.

6. The desalinization apparatus according to claim 3, wherein said distillator and said additional distillator contain respective pipe means within which a gas pipe is disposed.

7. The desalinization apparatus according to claim 6, wherein an aperture is longitudinally provided in said gas pipe at the top portion thereof.

8. The desalinization apparatus according to claim 1, wherein said second heat collector connects to a blowing pipe member disposed at the bottom portion within said first heat exchanger.

9. The desalinization apparatus according to claim 8, wherein said blowing pipe member includes a plurality of openings which are provided at the top portion thereof.

10. The desalinization apparatus according to claim 1, wherein said oil comprises a light oil.

11. The desalinization apparatus according to claim 1, wherein said first heat exchanger comprises an outer pipe member and a plurality of heat exchanging pipe members which are disposed in said outer pipe member.

* * * * *